United States Patent [19]
Bleak et al.

[11] 3,940,594
[45] Feb. 24, 1976

[54] AUTOMATIC PROCESS CONTROLLER WITH BUMPLESS OPERATION

[75] Inventors: Thomas M. Bleak, Whittier; Paul L. Hansen, Brea, both of Calif.

[73] Assignee: Beckman Instruments, Inc., Fullerton, Calif.

[22] Filed: Aug. 13, 1974

[21] Appl. No.: 497,097

[52] U.S. Cl. ............... 235/150.1; 318/591; 307/87
[51] Int. Cl.² .......................................... G05B 7/00
[58] Field of Search ............. 235/151, 150.1, 151.1; 318/591

[56] References Cited
UNITED STATES PATENTS

| | | |
|---|---|---|
| 3,523,193 | 8/1970 | Hutcheon ..................... 318/591 X |
| 3,549,976 | 12/1970 | De Bretagne ..................... 318/591 |
| 3,662,275 | 5/1972 | Riley ............................. 318/591 X |
| 3,694,633 | 9/1972 | Lejon ............................. 235/151.1 |

*Primary Examiner*—Eugene G. Botz
*Attorney, Agent, or Firm*—R. J. Steinmeyer; N. E. Brunell

[57] ABSTRACT

An electronic process controller is disclosed having automatically bumpless operation. Changes such as transfer between manual and automatic modes, switching between set point sources and adjustment of control parameter values are all accomplished bumplessly with the aid of a settle circuit which adjusts the automatic control signal for bumpless switching while the manual memory freezes the process control signal at its last value before the change was initiated.

18 Claims, 5 Drawing Figures

AUTOMATIC PROCESS CONTROLLER WITH BUMPLESS OPERATION

BACKGROUND OF THE INVENTION

1. Field of the Invention

The instant invention is related to the automatic control of industrial processes. In a typical installation a process variable monitor or transmitter, such as a temperature probe, is used to generate a process value signal or PVS related to the present value of a process variable, such as temperature. A set-point generator provides a set-point signal or SPS which is equal to or related to the desired value of the process variable signal as determined by process requirements. An automatic process controller is used to generate a process control signal or PCS which is used to control a final operator intimately related to the process variable such as a flow valve operator. In this manner, the temperature of a liquid in the boiler, for example, may be controlled automatically by varying fluid flow through a valve.

This invention further relates to multi-functional process controllers of the type having both automatic and manual modes of operation.

In the automatic control mode of operation, a control circuit is used to generate an automatic control signal or ACS by applying a control algorithm, selected to fulfill process requirements, to a deviation signal or DS related to the deviation of the process value signal from the set-point signal. In this mode the ACS is used as the PCS to control the final operator to minimize the deviation of the process value from the set point. A typical control algorithm may require the ACS to be equal to or related to the sum of two or more terms or parameters including, for example, the DS multiplied by a proportionality or gain constant, the derivative of the DS called the rate term, and the integral of the DS called the reset term. These terms are usually adjustable by external means to vary the proportionality constant and the time constants of the rate and reset terms.

The set-point signal may be supplied by a local signal generator called the local set-point source or by a remote set-point source which may be the PCS of another controller arranged in cascade fashion or the output of a supervisory computer.

In the manual control mode an adjustable memory device called the manual memory is used to generate a constant manual control signal or MCS related to a value stored in the memory which may be adjusted by a process operator or process engineer according to process requirements. Manual memories may be constructed from analog components or, preferably, from a digital value storage device as described in our co-pending U.S. patent application Ser. No. 497,098 filed on even date herewith. Each patent application relates to different features of the same automatic process controller.

This invention still further relates to automatic process controllers for use with process installations in which an abrupt change in the process control signal is undesirable. Such abrupt changes in the PCS, called bumps, may be caused by transfer between modes, adjustment of the control parameters or switching between set-point sources. This invention therefore particularly relates to automatic process controllers providing automatically bumpless operation.

2. Description of the Prior Art

Early automatic process control installations utilized a non-automatic transfer system requiring a "balance" mode in order to achieve bumpless operation. In such systems an operator was required to physically adjust certain values during the balance mode in accordance with other values displayed by the controller to avoid bumps.

The conventional approach to providing automatically bumpless operation of a process controller is to provide bumpless transfer between automatic and manual modes of control. A bumpless transfer between automatic and manual modes of control. A bumpless transfer between automatic and manual modes occurs when ACS, PCS and MCS are all equal at the instant of transfer. The conventional approach therefore causes ACS to track PCS during the manual mode and MCS to track PCS during the automatic mode so that at the instant of transfer in either direction ACS = MCS. Automatic transfer between automatic and manual modes of control according to the above described philosophy is shown in U.S. Pat. Nos. 3,523,193; 3,550,014 and 3,655,992.

A major drawback of such approaches is that they provide automatically bumpless operation only for transfer between manual and automatic modes of operation. Switching between set-point sources and/or adjustment of the parameters cannot be accomplished bumplessly during the automatic mode of control with conventionally known systems.

SUMMARY OF THE INVENTION

The instant invention accomplishes bumpless transfer between automatic and manual modes of operation by providing a settle circuit which causes ACS to track PCS during the manual mode and by switching the input of the manual memory during automatic mode so that MCS tracks PCS.

In a preferred embodiment, during a transfer, the settle circuit modifies ACS by supplying an additional input to the reset generator which is equal to the deviation of ACS from PCS while PCS is frozen in the manual mode. When the controller is returned to the automatic mode of control PCS changes to the value required by the new settings in accordance with the control algorithm.

In a typical installation this change would occur at a rate primarily determined by the reset rate which is chosen as an acceptable rate of change with respect to the time constants of the particular process being controlled.

The settle circuit is also used to provide bumpless switching between set-point sources and bumpless adjustment of the set-point and parameter settings by the process operator. Logic circuitry is provided so that when switching between set-point sources is initiated the controller is bumplessly transferred to the manual mode of control in order to freeze PCS whereupon the set-point sources are switched without causing a bump. After switching, the settle circuit is utilized to make ACS equal to PCS whereupon the controller may be returned to the automatic mode of operation bumplessly. PCS then changes to the value required by the new set-point source in accordance with the control algorithm.

Parameter and set-point value adjustments are accomplished bumplessly in the same manner, that is, when a parameter adjustment is initiated logic circuitry is provided to place the controller in the manual mode of operation while the parameter or set-point value changes are made. The controller is returned to the automatic mode of operation with the new values only after the settle circuit has caused ACS to be equal to PCS so that the transfer is bumpless. PCS then changes to the value required by the new set-point source in accordance with the control algorithm.

In a preferred embodiment a dynamic fail function is also provided in which the logic automatically switches from the currently used set-point source to a preselected dynamic fail set-point source when a dynamic fail situation is detected. A dynamic fail situation may be detected by any external means, including a command by the operator, a computer, another controller or an alarm circuit. The dynamic fail set-point source may be equal to the local set-point source, the remote set-point source, the process value signal, or any other level desired during a dynamic fail situation as determined by the process operator in view of the process requirements. Automatically bumpless switching in response to a dynamic fail situation is accomplished by the settle circuit and logic as described immediately above.

DESCRIPTION OF A PREFERRED EMBODIMENT

A preferred embodiment of the instant invention will be described with reference to FIG. 1. The components are shown in block diagram form using conventional symbols. These components may be constructed from devices currently available in the market, for example, high gain operational amplifiers. In the alternative, these components could be constructed from discrete electronic parts such as resistors and transistors. Various constructions of these components are well known in the art and form no part of this disclosure.

To generate the process control signal PCS in the automatic mode the process value signal PVS is combined with the set-point signal SPS in comparator 10. The output of comparator 10 is the deviation signal DS. In the simplest form of controller this signal is applied to an adjustable gain stage, shown as amplifier 12, the output of which is the automatic control signal or ACS. Adjustment of gain amplifier 12 provides the gain parameter adjustment in the control signal provided to the process. Additional terms or parameters in PCS are conventionally provided by reset and rate generators which may be arranged as follows. Rate generator 14 receives DS as an input and generates a signal related to the derivative of DS. This rate term is combined in summer 16 with DS before it is supplied to gain stage 12. Similarly, reset generator 18 receives DS as an input and provides a reset term related to the integral of DS to summer 16. The time constants of both the reset and rate terms are normally externally adjustable parameters. In this manner ACS may include proportioinal, rate and reset terms in any desired combination. In the automatic mode ACS is supplied to buffer amplifier 20 through position A of switch S1. Buffer 20 generates the process control signal PCS supplied to the final operators.

Manual memory 22 may be conveniently described as a track and hold component which serves to track PCS through position A of switch S2 during the automatic mode. Manual memory 22 is caused to store the last value it was tracking when switch S2 is moved to the M position. In the M position of S2 the value stored in memory 22 may be externally changed by manipulation of manual signal source 38. The output of memory 22 is the manual control signal or MCS which is supplied to buffer 20 to provide PCS during the manual mode through position M of switch S1.

The configuration described above is completely conventional. To this conventional configuration is added comparator 24 which receives as inputs ACS and PCS. The output of comparator 24 is therefore a signal equal to the deviation between ACS and PCS. In other words, the output of comparator 24 represents the potential bump that would be applied to the process if a mode transfer or other change was not accomplished bumplessly. This deviation signal is supplied through the closed position, position C, of switch S3 as an additional input to reset generator 18. As will be described hereinbelow, it is convenient to supply this deviation signal to reset generator 18 in such a manner than the effective time constant of this deviation signal is different than the effective time constant of the reset term in the algorithm. In particular a shorter time constant in the settle loop is desirable to allow the settle circuitry to "override" the normal reset parameter of the controller.

The set-point signal SPS may be supplied to comparator 10 from adjustable local set-point source 28, remote set-point source 30 or dynamic fail set-point source 32 through positions L, R and DF of switch S4, respectively.

Figure 3:
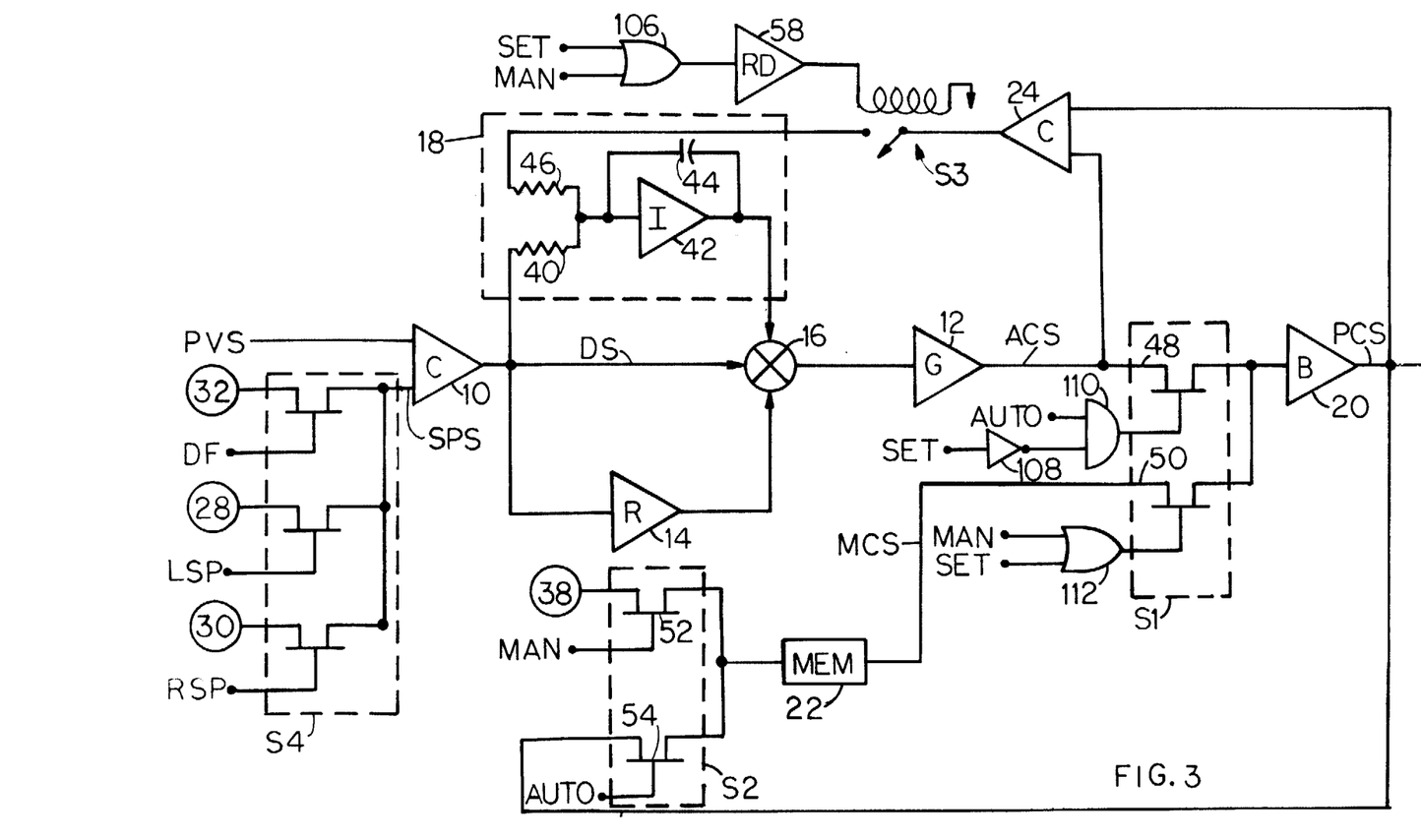
FIG. 3 is a more detailed schematic of the portion of the automatic process controller shown in FIG. 1.

Switches S1, S2 and S4 may conveniently be groups of field-effect transistors, FET's, and switch S3 may conveniently be the contacts of an electromagnetic relay as shown in FIG. 3.

As shown in FIG. 3, reset generator 18 is typically an integrator configured from a high gain operational amplifier having a capacitor in its feedback loop. Typical process requirements demand reset time constants such that the input of the amplifier described immediately above is a high impedance point. Simply stated, this means that even normally acceptable current leakage paths from this point tend to degrade controller operation unacceptably. An electromagnetic relay, or other switching device which has an extremely high impedance in the "off" position, must be used when attempting to connect an additional input, especially one with a relatively short time constant, to the high impedance point of the reset generator. Special care, in a manner known in the art of electromechanical equipment packaging, must be exercised to further protect this point. These four switches may be actuated in the sequence described below with reference to FIG. 2 in order to achieve bumpless operation of the controller.

Figure 2:
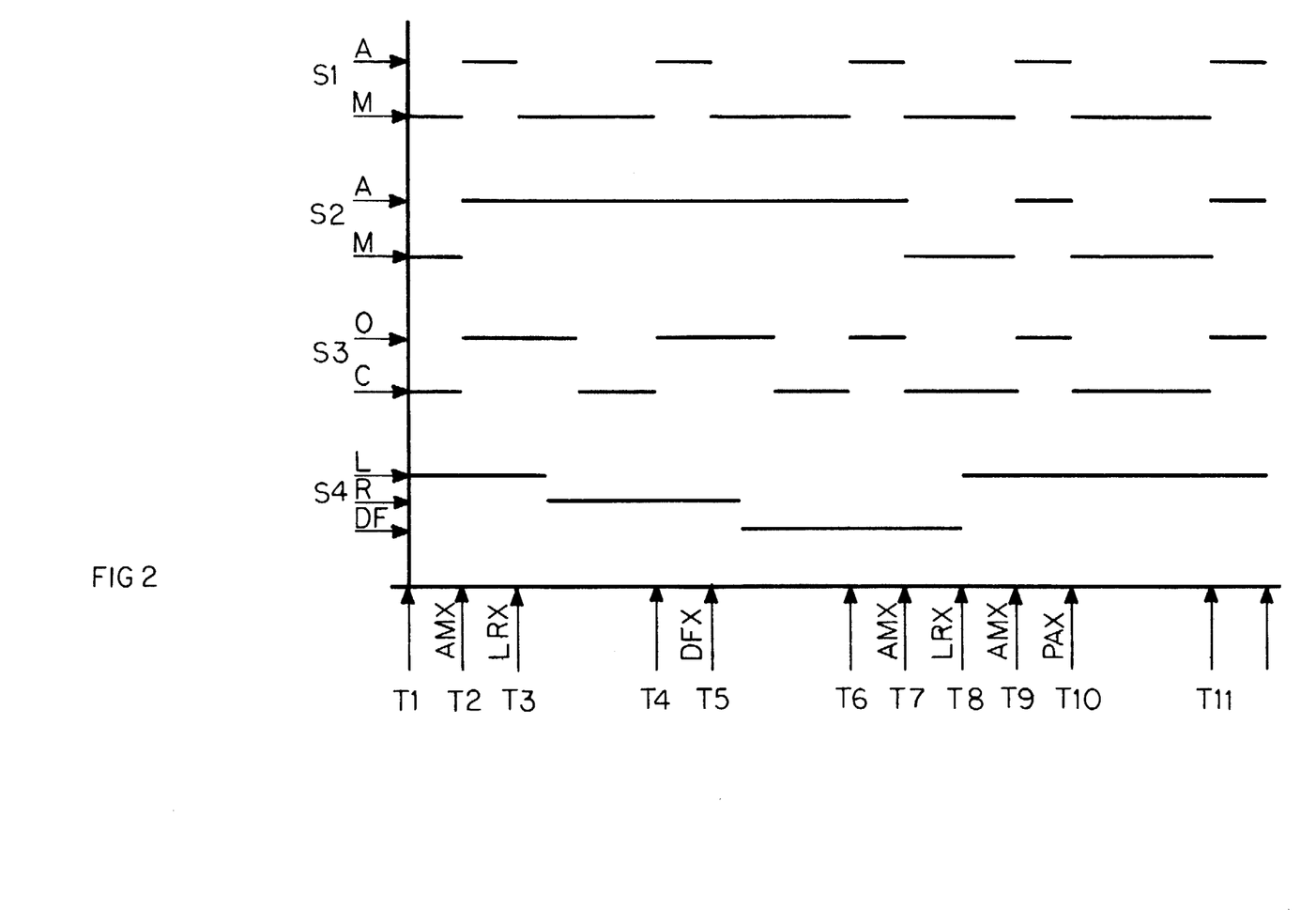
FIG. 2 is a series of graphical representations of the positions of the switches shown in the controller in FIG. 1, on a common time axis, depicting a typical sequence of position changes during automatic bumpless operation.

FIG. 2 is a graphical representation of the states of switches S1, S2, S3 and S4 shown on a common time axis. Time increases to the right but the time periods shown are arbitrary. At time T1 the switches are shown in positions corresponding to the manual mode of operation. That is, S1 and S2 are in the M position, S3 is in the C position and S4 is arbitrarily shown in the L position.

A series of changes will be described below with reference to the positions of switches S1 through S4 as controlled by the logic to provide bumpless operation. The following description is exemplary of the function of the logic and may easily be extrapolated to provide bumpless balanceless switching for other functions not shown herein. The sequence of transfers and switching represented by FIG. 2 is purely arbitrary and was chosen merely to illustrate the possible changes that would occur during operation of an installed controller.

At time T2 a transfer from manual to automatic mode is accomplished.

At this time switches S1 and S2 are moved to the A position and switch S3 is opened. This action places the controller in the automatic mode of operation after ACS has been forced equal to PCS in order to prevent a bump in the process control signal.

At time T3 a change is initiated from the local set-point function to the remote set-point function. S1 is moved to the M position so that PCS is supplied from manual memory 22. At some time thereafter switch S4 is moved to the R position, effectively changing the set-point source. After this change has been made, switch S3 is closed for a time period designated as the settle time to adjust ACS to be equal to PCS so that at time T4, when S3 is opened, switch S1 may be moved to the A position returning the controller to the automatic mode of operation with a new set-point source without causing a bump in the process control signal.

The settle time must be sufficiently long to allow reset generator 18 to cause a full-scale change in ACS in order to accommodate the worst case condition of a full-scale difference between ACS and PCS. This minimum time period is dependent upon the time constant associated with reset generator 18 for the signal supplied by comparator 24. In the preferred embodiment this settle time period has a predetermined length greater than the minimum required settle time. In alternate embodiments it is possible to control the length of the settle time to correspond to the minimum required settle time by opening switch S3 when the output of comparator 24 reaches zero.

At time T5 a dynamic fail situation is detected. Switch S1 is moved to the M position, causing PCS to be supplied by manual memory 22. Switch S4 may be then moved to the DF position, providing the dynamic fail source as the set-point signal. Switch S3 is then closed for the settle time so that at time T6, at the end of the settle time period, switch S3 may be opened and switch S1 returned to the A position, placing the controller in the automatic mode of operation with the dynamic fail set-point source.

At time T7 a transfer from the automatic mode to the manual mode is accomplished bumplessly by moving switches S1 and S2 to the M position so that PCS is supplied by manual memory 22 which was tracking PCS until the instant before transfer.

It must be noted in all of the above changes of operation that the transfer of S1 from the A position to the M position is accomplished in a bumpless fashion because when S2 is in the A position the manual memory 22 is caused to track PCS. Therefore, at the instant of transfer of S1 MCS equals ACS.

At time T8 a transfer is initiated from the dynamic fail set-point source function to the local set-point source function. This is accomplished bumplessly by merely moving switch S4 from the DF position to the L position. Since, during the manual mode PCS is supplied from manual memory 22, a change in the set-point source cannot affect PCS. At time T9 a transfer is initiated back to the automatic mode of operation. This transfer is identical to the transfer beginning at time T2. This action switches S1 and S2 are returned to the A position. This action provides bumpless transfer to the automatic mode even though the set-point sources had been switched while in the manual mode. At time T9 the controller is in the automatic mode of operation with a local set-point source.

At time T10 a parameter change is initiated. Switches S1 and S2 are moved to the M position so that the PCS is supplied from manual memory 22. Switch S3 is then maintained in the closed position until the parameter changes are completed. The actual parameter adjustments are usually completed externally by, for example, manipulation of a potentiometer knob, such as parameter adjust source 39, by a human process operator. During this time PCS is generated by manual memory 22 at its stored value which is equal to the value of PCS before the transfer was initiated. In this way it can be seen that PCS is frozen at its last value by manual memory 22 while any required changes or switching is accomplished. After the switching is accomplished, comparator 24 is allowed to adjust ACS to be equal to PCS which is in fact the signal stored in memory 22. Drift of memory 22 for the few moments required is not noticeable even in the analog track and hold circuits currently available. At time T11 switch S3 may then be opened and switch S1 and S2 returned to the A position, returning the controller to the automatic mode of operation bumplessly.

It is necessary however to assure that switch S3 will remain closed for a period equal to the settle time after the parameter change has been completed in order to guarantee that the settle circuit has sufficient time to make ACS equal to PCS.

Figure 4:
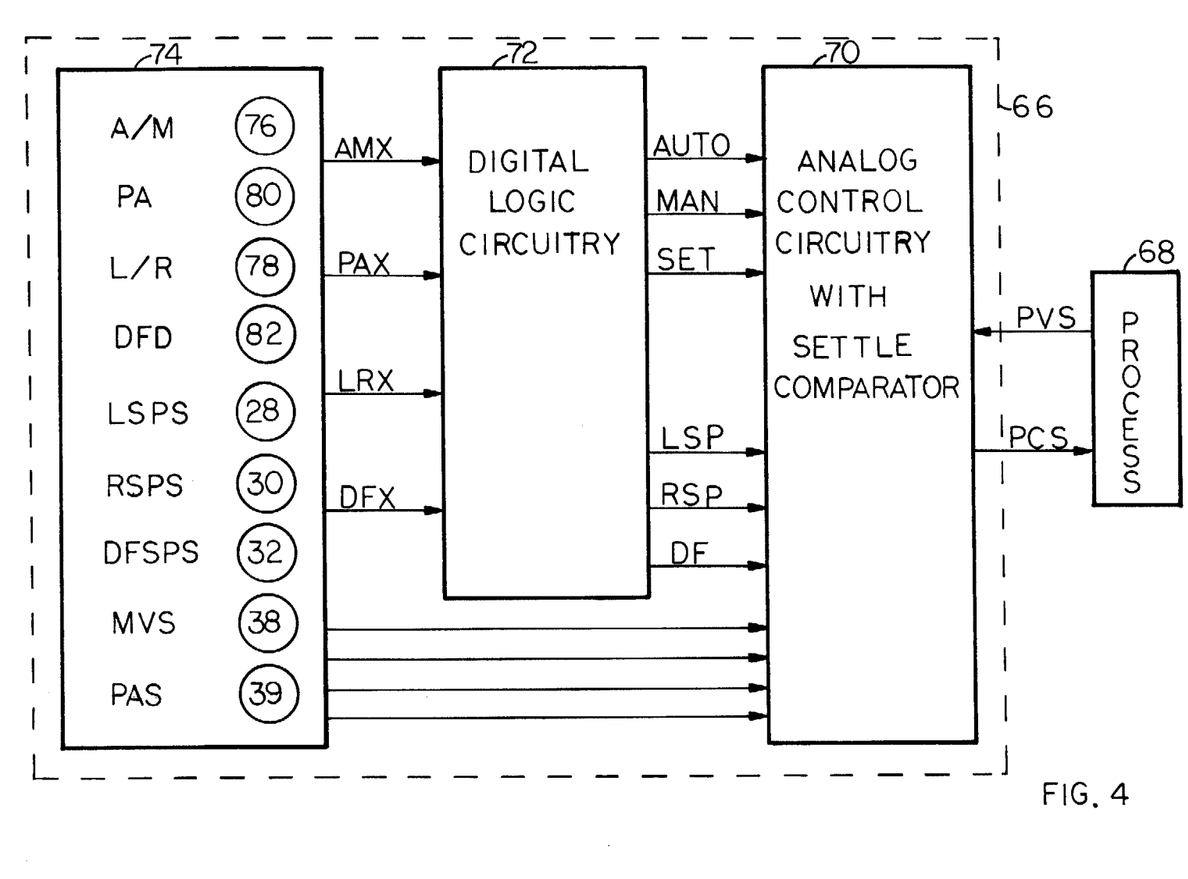
FIG. 4 is a block diagram of a complete automatic process controller according to the instant invention.

FIGS. 3 and 4 will be used to describe in greater detail the controller of the instant invention.

Figure 1:
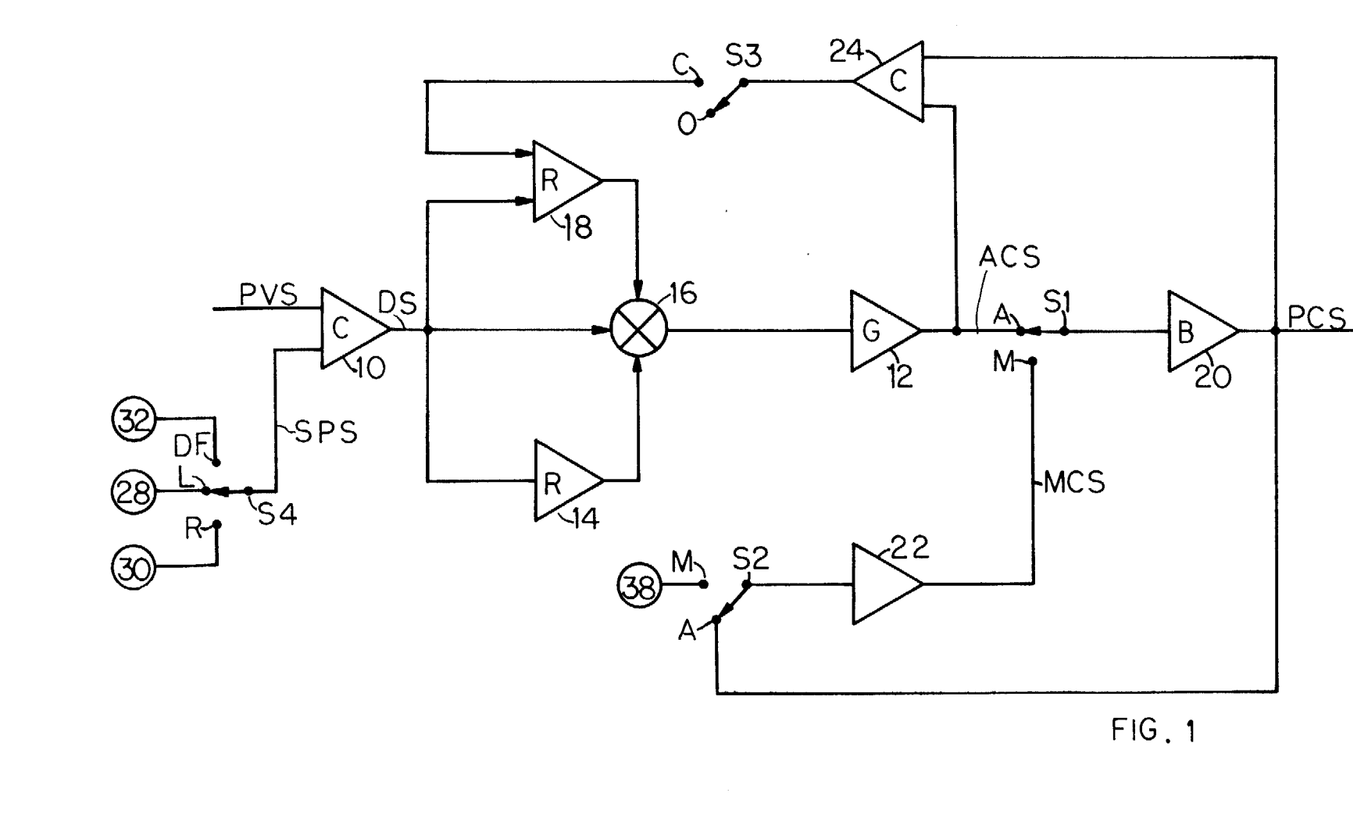
FIG. 1 is a schematic in block diagram form of the analog control circuitry portion of an automatic process controller including means for automatic bumpless operation according to the instant invention.

In FIG. 3 sources 28, 30 and 32, comparator 10, rate generator 24, summer 16, gain stage 12, settle comparator 24, manual memory 22 and buffer amplifier 20 are the same as shown in FIG. 1.

Reset generator 18 is shown in greater detail as follows. Resistor 40 connects the deviation signal to the input of amplifier 42 which is provided with capacitor 44 in its feedback loop to serve as an integrator as discussed above. The time constant of the reset term in PCS is therefore dependent upon resistor 40 and capacitor 44. The deviation signal generated by settle comparator 24 is provided to the input of amplifier 42 through resistor 46. The time constant of the settle circuit is therefore dependent on resistor 46 and capacitor 44.

Operation of switches S1–S4 in FIG. 3 are controlled by certain logic signals which will be described with reference to FIG. 4.

Switch S1 has been replaced by FET's 48 and 50 in FIG. 3 which, when activated, correspond to positions A and M respectively as shown in FIG. 1. S2 has similarly been replaced by FET's 52 and 54, which correspond to positions M and A, respectively. Switch S3 is shown as relay 56 and relay driver 58. Switch S4 has been replaced by FET's 60, 62, and 64, which corresponds to positions DF, L and R, respectively.

The FET's and relay shown in FIG. 3 are controlled by digital status signals generated by the logic shown in FIG. 4 in response to demands for changes by the operator or other external means as described below.

FIG. 4 shows a complete process controller 66 for supplying PCS to process 68 and receiving therefrom PVS. Controller 66 includes analog control circuitry 70 which has been described in detail with respect to FIGS. 1 and 3. Controller 66 also includes digital logic circuitry 72 which may be configured from discrete digital electronic components or a time shared portion of a digital computer. Logic circuitry 72 provides the status signals AUTO, MAN, SET, LSP, RSP, and DF in response to process operator initiated signals AMX, PAX, LRX and DFX. Logic circuitry 72 may be configured in any convenient manner to accept the above reference inputs and generate the above referenced outputs to control the switches in analog circuitry 70 in the sequence described with reference to FIG. 2.

Figure 5:
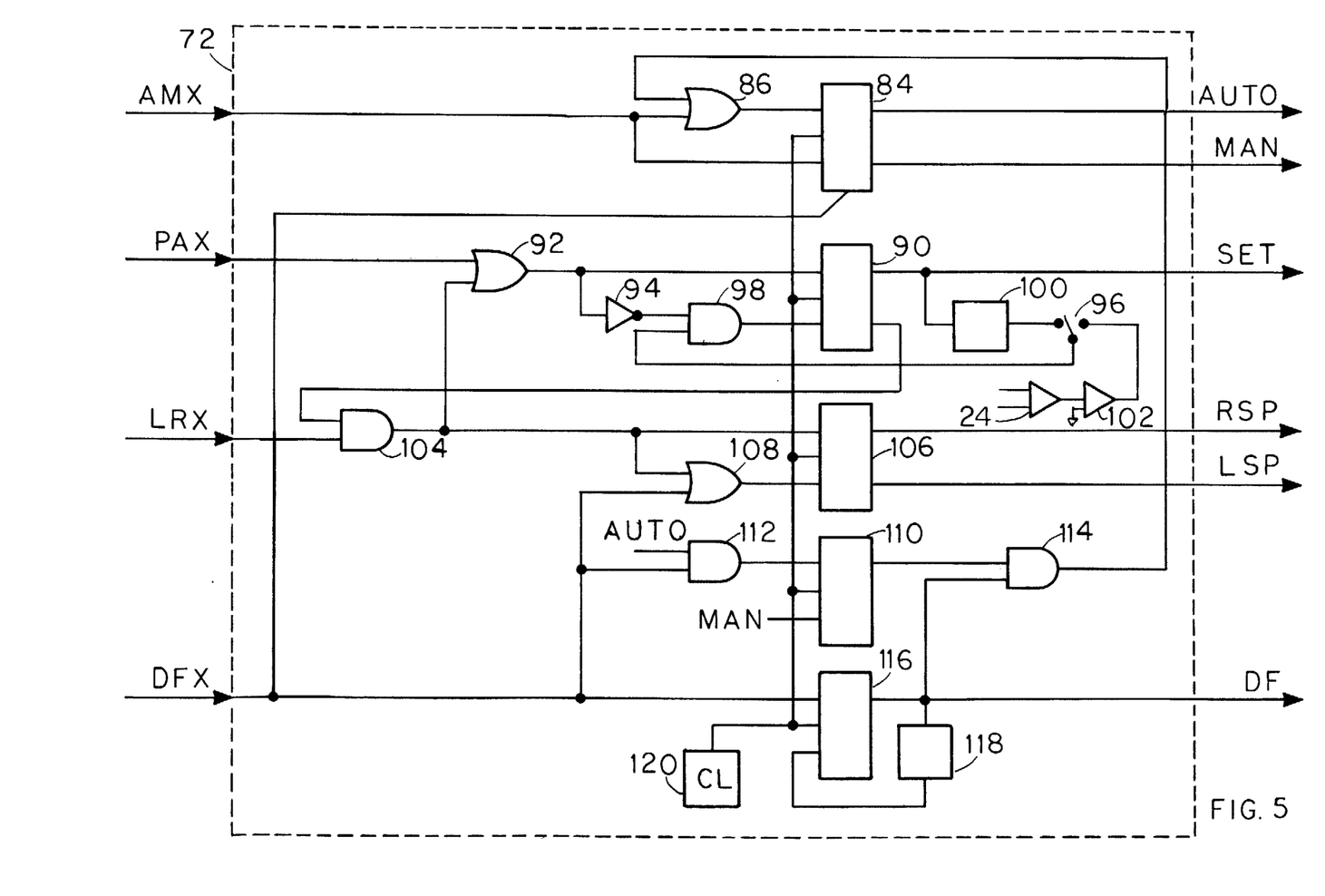
FIG. 5 is a schematic in block diagram form of the digital logic circuitry portion of the automatic process controller shown in FIG. 4.

FIG. 5 is a schematic in block diagram form of logic circuitry 72. AUTO and MAN are generated alternately by auto/manual flip-flop 84 which may conveniently be a clocked and directly resettable JK flip-flop. AMX and the return to auto signal, described hereinbelow, are combined in OR gate 86 at the set input of flip-flop 84. The synchronous reset input is connected directly to AMX so that flip-flop 84 toggles every time AMX is present. Flip-flop 84 is directly reset to provide MAN by DFX.

SET is the output of SET flip-flop 90. The synchronous set input to flip-flop 90 is provided by the output of OR gate 92, one input of which is PAX. The output of OR gate 92 is inverted by inverter 94 and combined with one side of switch 96 in AND gate 98. The output of AND gate 98 is connected to the synchronous reset input of flip-flop 90. In a first position switch 96 serves to connect the output of time delay 100 to the input of AND gate 98. The input to time delay 100 is SET. Therefore, in this position of switch 96, flip-flop 90 will generate SET for a time period equal to the time delay of delay 100 or the period of time PAX is present, whichever is longer. This switch position is therefore the fixed settle time period position.

The other position of switch 96 connects the output of comparator 102 to the input of AND gate 98. One side of comparator 102 is grounded. The other input is provided by the output of comparator 24 shown in FIG. 1 and FIG. 3. When switch 96 is in this position, therefore, flip-flop 90 generates SET until ACS is made equal to PCS as determined by comparator 24 or until PAX is no longer present, whichever is longer. The reset output of flip-flop 90 is combined with LRX in AND gate 104, the output of which is connected to OR gate 92 so that SET will also be generated in response to LRX.

The output of AND gate 104 is also applied to the synchronous set input of local/remote flip-flop 106 which generates RSP. The synchronous reset input of flip-flop 106 is the output of OR gate 108, the inputs of which are DFX and the output of AND gate 104. The synchronous reset output of flip-flop 106 is LSP DFX is also applied to the synchronous set input of the return to automatic flip-flop 110 by being combined with AUTO in AND gate 112. The set output of flip-flop 110 is combined with DF, to be described below, in AND gate 114 to generate the return to automatic signal described above and applied to the input of OR gate 86. The synchronous reset input to flip-flop 110 is MAN. DFX is also applied to the synchronous set input of dynamic fail flip-flop 116, the set output of which is DF. DF is applied to delay 118 which is connected to the synchronous reset input of flip-flop 116. DF is therefore generated for the time period determined by the delay of delay 118.

Clock 120 provides clock pulses for the above-described flip-flops. The clock frequency is dependent upon the pulse width of AMX, PAX, LRX and DFX. The period of the clock is conveniently equal to the width of the pulses.

It can be seen from the above description that logic circuitry 72 generates the above-described outputs to control the switches and circuitry 70 in response to the above-described inputs in the sequence described with reference to FIG. 2. Times T2, T7 and T9 correspond to receipt by digital logic circuitry 72 of the signal AMX, T3 and T8 represent signal LRX, T5 represents DFX and T10 represents PAX.

These signals are generated by operator's interface 74 in the following manner. The human operator may initiate a transfer between automatic and manual modes of operation by activation of pushbutton 76 which, with proper signal conditioning not shown, generates time pulse AMX. In a similar manner the operator may initiate a local remote transfer by activation of pushbutton 78 which generates LRX.

The operator may adjust the parameter values in analog control circuitry 70 in a bumpless fashion by adjusting parameter adjust source 39 while depressing parameter adjust pushbutton 80 which generates the signal PAX until a settle time period after pushbutton 80 has been released. Dynamic fail detector 82 is shown for convenience within operator's interface 74 and may indicate a dynamic fail condition by generating pulse DFX.

For convenience the adjustable local set-point source 28, remote set-point source 30, dynamic fail set-point source 32 and MCS value source 38 are shown within operator's interface 74.

The status signals are utilized to control the switches in the analog control circuitry shown in FIG. 3 in the following manner. SET and MAN are combined in OR gate 106 to activate relay driver 58 which closes the contacts of relay 56. Status signals DF, LSP and RSP activate FET's 60, 62 and 64 to connect comparator 10 to sources 32, 28 and 30, respectively. SET is inverted by inverter 108 and then combined with AUTO in AND gate 110 to activate FET 48. MAN and SET are combined in OR gate 112 to activate FET 50 and MAN and AUTO are utilized to activate FET's 52 and 54, respectively.

Operation of the logic shown in FIGS. 3 and 4 may be summarized as follows. Initiation of an auto/manual transfer, a local/remote switching or a dynamic fail status places the controller in the manual mode so that the required switching may be accomplished and the settle circuit activated to adjust the ACS to be equal to the PCS so that return to automatic control may be accomplished bumplessly. Similarly, the time constants of the rate and reset generators, the proportionality constant of the gain stage, the values of the set-point sources and any other adjustments of values in the controller may be accomplished when pushbutton 80 is depressed. Activation of pushbutton 80 places the controller in the manual mode freezing PCS at its last value until after the changes have been made and the settle circuit has adjusted ACS so that return to automatic may be accomplished bumplessly. The controller is returned to the automatic mode when pushbutton 80 is released. PCS then changes to the value required by the new settings in accordance with the control algorithm.

The controller disclosed herein thereby provides automatically bumpless operation. An especially important function is also provided by means of which a human operator may guarantee, by temporarily depressing a pushbutton, that any change or alteration of the controller conditions he causes will not result in a bump in the process control signal supplied to the field.

What is claimed is:

1. An improved automatic process controller having adjustable parameters operable in manual and automatic modes of the type having:

automatic control means for generating an automatic control signal during the automatic mode related to the deviation of a process value signal from a set-point signal, manual memory means for generating an adjustable manual control signal during the manual mode, an output switch for selectively applying one of the control signals to the process to be controlled, means to cause the automatic control signal to track the signal applied to the process during the manual mode, and means to cause the manual control signal to track the signal applied to the process during the automatic mode, wherein the improvement comprises:

bumpless adjust means for initiating a change in the operation of the automatic control means;

first logic means responsive to actuation of the bumpless adjust means to operate the output switch to apply the manual control signal to the process;

a settle circuit for causing the automatic control signal to become equal to the signal applied to the process only when actuated;

second logic means responsive to actuation of the bumpless adjust means for generating a settle time period and for activating the settle circuit during the settle time period; and third logic means for operating the output switch to apply the automatic control signal to the process at the end of the settle time period.

2. The improved controller of claim 1 wherein:

the bumpless adjust means is a set-point selector switch for initiating a change between sources of the set-point signal applied to the automatic control means.

3. The improved controller of claim 1 wherein the settle time period has a predetermined duration sufficiently long to allow the settle circuit to cause a full scale change in the value of the automatic control signal.

4. The improved controller of claim 1 wherein:

the bumpless adjust means is a dynamic fail situation detector for initiating a change from the current source of the set-point signal to a predetermined dynamic fail set-point source.

5. The improved controller of claim 1 wherein:

the bumpless adjust means is a pushbutton; and the settle time period exceeds the period of time during which the pushbutton is actuated by a period of time sufficiently long to allow the settle circuit to make a full scale change in the values of the automatic control signal.

6. The improved controller of claim 5 wherein the change means comprises means to change the value of the set-point signal.

7. The improved controller of claim 1 wherein the settle circuit comprises:

a comparator arranged to generate a deviation signal related to the deviation between the automatic control signal and the signal applied to the process; and means to apply the deviation signal to the automatic control means to reduce the deviation signal to zero.

8. The improved controller of claim 7 wherein the settle time period is terminated when the deviation signal becomes zero.

9. The improved controller of claim 1 wherein the settle circuit comprises:

means to provide a first term in the analog control signal related to the integral of the deviation of the automatic control signal from the control signal applied to the process.

10. The improved controller of claim 9 of the type further having a reset generator to provide a term in the analog control signal related to the integral of the deviation of the process value signal from the set-point signal, wherein the time constant of the first term is shorter than the time constant of the second term.

11. The method of automatically bumplessly operating a process controller having automatic means for generating an automatic control signal and manual means for generating a manual control signal while changing the operation of the automatic means, comprising the steps of:

applying the automatic control signal to the process to be controlled during an automatic mode while causing the manual control signal to track the signal applied to the process;

applying the manual control signal to the process during a manual mode while causing the automatic control signal to track the signal applied to the process;

determining a transfer period when a change is initiated that would result in a bump in the signal applied to the process;

applying the manual control signal to the process during thhe transfer period;

accomplishing the change during the transfer period, providing a settle circuit to make the automatic control signal equal to the manual control signal during the transfer period, and reapplying the automatic control signal to the process at the end of the transfer period.

12. The method of claim 11 wherein:

the transfer period has a predetermined duration sufficiently long to allow the settle circuit to cause a full scale change in the value of the automatic control signal.

13. The method of claim 11 wherein:

the transfer period is terminated when the automatic control signal is equal to the manual control signal.

14. The method of claim 13 further comprising:

initiating a change when a bumpless adjust pushbutton is manually actuated.

15. The method of claim 14 wherein:

the transfer period exceeds the period of time during which the pushbutton is actuated by a predetermined period sufficiently long to allow the settle circuit to cause a full scale change in the value of the automatic control signal.

16. The method of claim 15 wherein:

the change is accomplished while the pushbutton is actuated.

17. The improved controller of claim 1 wherein: the change means is a set point source switch actuated in response to the bumpless adjust means to change the source of the set point signal applied to the automatic control signal.

18. The improved controller of claim 5 wherein:

the change means is a manually operable parameter adjustment means for adjusting the parameters of the automatic means for generating an automatic control signal, said parameter adjustment means being operable while the pushbutton is actuated.

* * * * *

UNITED STATES PATENT OFFICE
CERTIFICATE OF CORRECTION

Patent No. 3,940,594     Dated February 24, 1976

Inventor(s) Thomas M. Bleak and Paul L. Hansen

It is certified that error appears in the above-identified patent and that said Letters Patent are hereby corrected as shown below:

Column 9, line 39, add the following:
--change means to accomplish the change;--

Column 9, line 50, "1" should read --17--.
Column 9, line 60, "1" should read --17--.
Column 10, line 50, "thhe" should read --the--.

Signed and Sealed this

*eighth* Day of *June 1976*

[SEAL]

Attest:

RUTH C. MASON
*Attesting Officer*

C. MARSHALL DANN
*Commissioner of Patents and Trademarks*